(12) United States Patent
Yasuda

(10) Patent No.: US 10,656,489 B2
(45) Date of Patent: May 19, 2020

(54) LIQUID CRYSTAL DISPLAY DEVICE

(71) Applicant: Mitsubishi Electric Corporation, Tokyo (JP)

(72) Inventor: Shohei Yasuda, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 16/147,903

(22) Filed: Oct. 1, 2018

(65) Prior Publication Data

US 2019/0107761 A1    Apr. 11, 2019

(30) Foreign Application Priority Data

Oct. 10, 2017 (JP) .................. 2017-196993

(51) Int. Cl.
*G02F 1/1362* (2006.01)
*G02F 1/1368* (2006.01)

(52) U.S. Cl.
CPC .. *G02F 1/136286* (2013.01); *G02F 1/136213* (2013.01); *G02F 1/1368* (2013.01); *G02F 2001/13629* (2013.01); *G02F 2201/56* (2013.01)

(58) Field of Classification Search
CPC .................. G02F 2201/56; G02F 1/136213
See application file for complete search history.

(56) References Cited

U.S. PATENT DOCUMENTS

| 2010/0134743 | A1* | 6/2010 | Shin .................... G02F 1/13 349/143 |
| 2010/0156945 | A1* | 6/2010 | Yoshida .............. G02F 1/1345 345/690 |
| 2010/0177270 | A1* | 7/2010 | Nakagawa ........... G02F 1/1345 349/141 |
| 2017/0123285 | A1* | 5/2017 | Suzuki ............... G02F 1/13306 |
| 2018/0005585 | A1* | 1/2018 | Kim .................... G09G 3/3233 |
| 2018/0006105 | A1* | 1/2018 | Kim .................... G09G 3/3258 |
| 2018/0046050 | A1* | 2/2018 | Xu ................... G02F 1/133553 |
| 2018/0138205 | A1* | 5/2018 | Miyamoto ........ H01L 27/14612 |

FOREIGN PATENT DOCUMENTS

| JP | 2002-014366 A | 1/2002 |
| JP | 2006-276360 A | 10/2006 |
| JP | 2009-069768 A | 4/2009 |
| WO | 2008/062575 A1 | 5/2008 |
| WO | 2018/030207 A1 | 2/2018 |

* cited by examiner

*Primary Examiner* — Sang V Nguyen
(74) *Attorney, Agent, or Firm* — Studebaker & Brackett PC

(57) ABSTRACT

In the case that a first scanning line having a smaller number of pixels to be driven than that of a second scanning line in a display device having a heteromorphic display region, capacitance is added to an extended scanning line in which the first scanning line extends to an outside of the display region. A large difference in RC delay between scanning lines generated by the number of pixels to be driven can be compensated for by adding the capacitance, so that luminance unevenness can be prevented to contribute to improvement of display quality.

8 Claims, 4 Drawing Sheets

LIQUID CRYSTAL DISPLAY DEVICE

BACKGROUND OF THE INVENTION

Field of the Invention

The present invention relates to a panel used in a display device, particularly to a liquid crystal display panel including a heteromorphic display region that is not rectangular.

Description of the Background Art

In the liquid crystal display device, there is an increasing demand for a heteromorphic panel in which the shape of the panel is not rectangular particularly in on-vehicle use. Various shapes such as a circular or semicircular shape, a concave or convex shape, a polygonal shape, and a shape having a notch exist as the shape of the heteromorphic panel, and the display region also has a heteromorphic shape that is not rectangular. (Japanese Unexamined Patent Application Publication No. 2002-14366)

One of features of the heteromorphic panel is that the number of pixels to be driven per scanning line or signal line is different among wirings. When the number of pixels to be driven is different among the wirings, capacitance or resistance is different in each wiring, and a difference in signal delay amount is generated. For the delay in the signal line, a bad influence of the delay on the display quality can be prevented by optimizing charging design of a thin film transistor (TFT) such as charging capacity and a charging time.

On the other hand, the signal delay of the scanning line influences a recharging characteristic generated in changing the scanning signal from ON to OFF, and therefore a pixel potential is influenced. It is also difficult to prevent this influence by a measure such as the charging design and avoidance by timing. Unevenness of the pixel potential caused by the difference in delay amount of the scanning signal causes luminance unevenness to degrade display quality.

Various techniques are known in order to improve the display quality. For example, in a panel having a circular or polygonal shape, there has been a technique of correcting the difference of each wiring by changing the area of the intersection of the scanning line and the signal line to adjusting the capacitance between pixels of the scanning line having a small number of driving pixels and pixels of other scanning lines. (Japanese Unexamined Patent Application Publication. No. 2006-276360) A method in which correction is similarly performed by appropriately crossing the signal line and the scanning line outside the display region has also been proposed. (Japanese Unexamined Patent Application Publication No. 2009-069768 and International Publication No. 2008-62575)

In designing the panel shape and arrangement of a driving circuit, layout is hardly performed in some cases even when the conventional technique is adopted. Specifically, the layout is hardly performed when the display panel has an L-shape or a concave shape. As used herein, the concave shape means a shape partially having a recessed region which does not contribute to the display in the display region. Details will be described later.

In the case that the display panel has the L-shape or the concave shape, the number of pixel arrays changes discontinuously and largely unlike circular shape, and the influence on appearance is larger because a characteristic changes largely with a notch as a boundary. In the case that the display panel has the concave shape having the notch, it is difficult to cross all the signal lines and the scanning lines in the region between the driving circuit and the display.

SUMMARY

An object of the present invention is to uniformize the display characteristic in a plane by reducing the difference in delay amount of the scanning signal, and to prevent display defects such as the luminance unevenness and a flicker, even in a panel having a notch and having a shape in which the number of pixels in each wiring varies discontinuously and largely.

A liquid crystal display device according to one aspect of the present invention is a liquid crystal display device including an array substrate and a counter substrate opposed to the array substrate, the array substrate and counter substrate being bonded to each other so as to enclose liquid crystal. The array substrate includes a display region and a peripheral region. A scanning line and a signal line that crosses the scanning line with an insulating film interposed therebetween extend from the display region to the peripheral region. The scanning line and the signal line cross each other in the display region define a pixel. The scanning line includes a first scanning line and a second scanning line. The first scanning line is smaller than the second scanning line in a number of the pixels to be driven. Capacitance is added to at least the first scanning line in the peripheral region.

In the liquid crystal display device of the present invention, the capacitance is added to at least the first scanning line in the peripheral region. Therefore, the display characteristic can be uniformized within the plane, and the display defects such as the luminance unevenness and the flicker can be prevented, even in the panel having the shape in which the number of pixels in each wiring discontinuously and largely.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
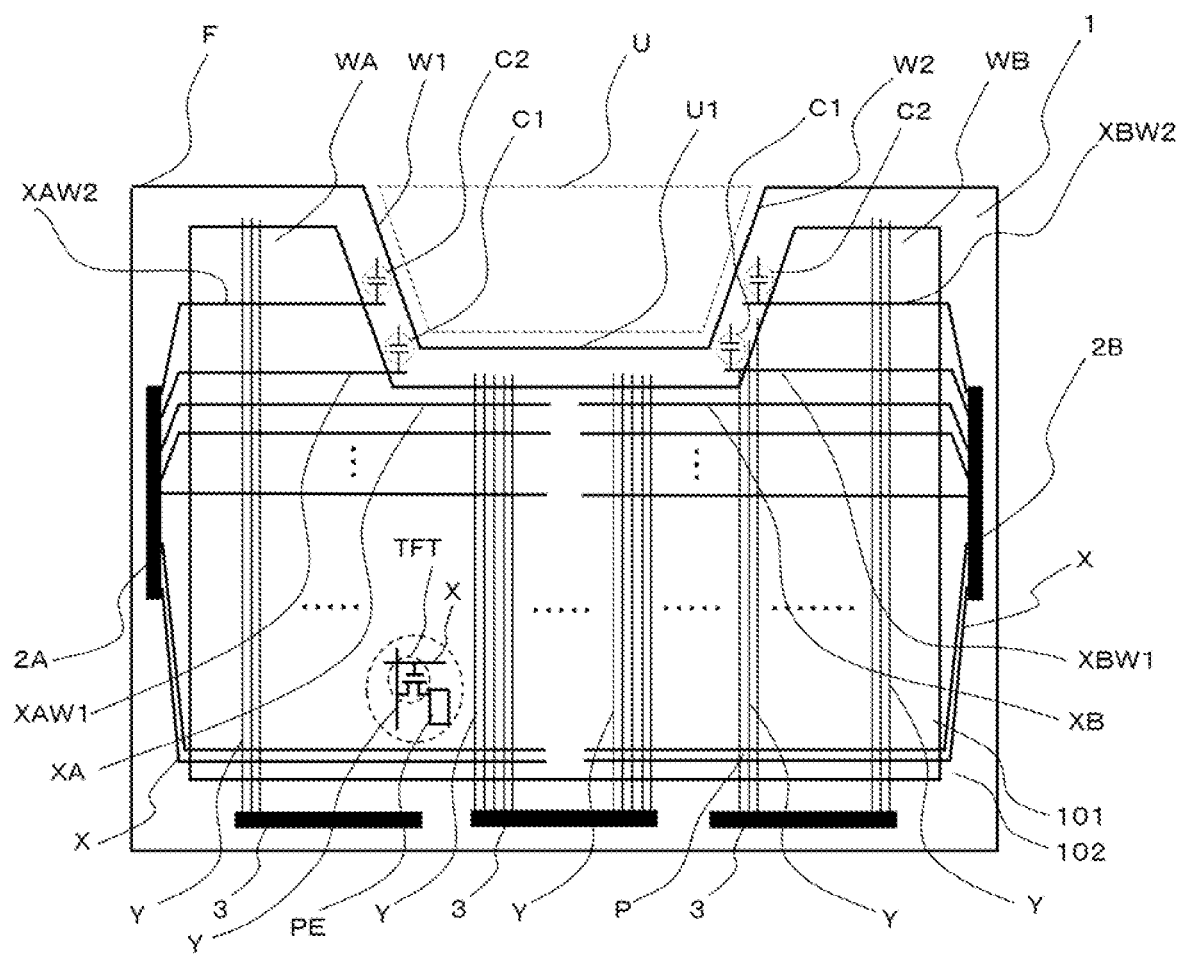
FIG. 1 illustrates a liquid crystal display device according to a first preferred embodiment.

FIG. 1 is a schematic plan view illustrating a liquid crystal display device according to a first preferred embodiment. As illustrated in FIG. 1, the liquid crystal display device includes an array substrate 1, a liquid crystal layer (not illustrated), and a counter substrate (not illustrated) opposed to the array substrate 1 with the liquid crystal layer interposed therebetween. The array substrate 1 and the counter substrate are bonded to each other by a sealing material (not illustrated) sealing the liquid crystal layer. A color filter may be formed on the counter substrate (not illustrated).

Referring to FIG. 1, the array substrate 1 includes a display region 101 including a plurality of pixels P, a plurality of scanning lines X, and a plurality of signal lines Y and a peripheral region 102 including scanning line driving circuits 2A, 2B and a signal line driving circuit 3. The peripheral region 102 is disposed outside the display region 101. The display region 101 corresponds to a display of a display device. The plurality of scanning lines X and the plurality of signal lines Y intersect each other in the display region 101, and the pixel P is defined by the intersection.

In the pixel P, a pixel electrode PE is formed, and a pixel transistor TFT which is a switching element and is connected to the pixel electrode PE is formed. In other words, the display region 101 is configured by the plurality of pixels P, and the pixel electrode PE and the thin film transistor TFT are formed in each pixel P. A counter electrode or a common electrode (not illustrated) opposed to the pixel electrode PE is also formed, and liquid crystal molecules in the liquid crystal layer are driven by an electric field between the pixel electrode PE and the counter electrode to contribute to display.

A connection relationship between the wiring and the driving circuit will be described. A plurality of scanning lines XA, XB that are the scanning lines X extend from the display region 101 to the peripheral region 102, and are connected to a scanning line driving circuit 2A or a scanning line driving circuit 2B through a terminal (not illustrated). In FIG. 1, the scanning line driving circuit 2A is disposed on the left side and the scanning line driving circuit 2B is disposed on the right side.

The plurality of signal lines Y intersect the plurality of scanning lines XA, XB in the display region 101, extend to the peripheral region 102, and are connected to a signal line driving circuit 3 through a terminal (not illustrated). The plurality of signal lines Y and the plurality of scanning lines X intersect each other with an insulating film (not illustrated) interposed therebetween. A display signal potential contributing to the display is supplied from the signal line driving circuit 3 to the plurality of signal lines Y. Similarly, a scanning signal potential is supplied from the scanning line driving circuit 2A or the scanning line driving circuit 2B to the plurality of scanning lines XA, XB.

The scanning line may be formed to intersect an inside of the display region 101, or may be formed to be divided into a left half and a right half in FIG. 1. In FIG. 1, the scanning line XA may be connected to the scanning line driving circuit 2A and the scanning line XB may be connected to the scanning line driving circuit 2B. In this case, it is necessary to properly synchronize the scanning line driving circuit 2A with the scanning line driving circuit 2B. A shape of the display region will be described below.

The display region 101 has a shape in which an upper side is partially recessed in FIG. 1. In other words, the display region 101 includes a recessed region U that is a notch illustrated as a region surrounded by a dotted line and projections WA, WB that are not recessed on a side F that is at least one side. In FIG. 1, the recessed region is surrounded by two edge sides W1, W2 of the projections WA, WB and a notch edge side U1. The notch edge side U1 is also a base of the recessed region U, and is also one of the edge sides of the display device.

In general, display means other than the liquid crystal display device in FIG. 1 is disposed in the region corresponding to the recessed region U, or nothing is disposed, so that a design effect is often rendered. Thus, the scanning line X, the signal line Y, and the pixel transistor are not provided in the recessed region U. In particular, it can be said that the scanning line X is divided by the recessed region U. Because there is no scanning line X intersecting the recessed region U, the first scanning lines XAW1, XAW2 and the first scanning lines XBW1, XBW2 are provided in the projections WA, WB located on the left and right of the recessed region U and connected to the left and right scanning line driving circuits 2A, 2B, respectively.

The first scanning lines XAW1, XAW2 are compared to the second scanning line XA, in the region where the recessed region U does not exist in the display region 101. Lengths of the first scanning lines XAW1, XAW2 are shorter than a length of the second scanning line XA.

For this reason, the second scanning lines larger than the first scanning lines XAW1, XAW2 in the number of the pixels P in which the wiring intersects and in the number of the pixels P to be driven by the wiring. Consequently, a difference in wiring resistance or capacitance is generated. Additionally, difference in wiring resistance or capacitance is maximized at a boundary between the presence and absence of the projections WA, WB and generated discontinuously, so that the luminance unevenness such that the luminance varies largely is generated at the boundary between the projections WA, WB, specifically, between upper and lower portions of the region where the notch edge side U1 is extended to the left and right.

In the first preferred embodiment, as illustrated in FIG. 1, the first scanning lines XAW1, XAW2 divided by the recessed region U are extended to the outside of the display region 101. The wirings extended to the outside the display region 101 is referred to as an extended scanning line in some cases. In the first preferred embodiment, capacitors C1, C2 are connected to the first scanning lines XAW1, XAW2 outside the display region 101. In other words, capacitance is added to the extended scanning line of the first scanning line.

The capacitors C1, C2 are used to compensate for a difference in RC delay caused by the difference of the wiring length or the number of pixels between the first scanning lines XAW1, XAW2 and the second scanning line XA, and each capacitor is set to a value suitable for the compensation. According to this configuration, the unevenness generated between the upper and lower portions of the region where the notch edge side U1 is extended to the right and left can be prevented, so that the degradation of the display quality can be prevented even in the case that a notch shape having the high design effect is adopted as illustrated in FIG. 1.

As to the form of the capacitors C1, C2, a capacitor electrode (not illustrated) having a region opposed to the extended scanning line may be formed with a film made of an insulating material such as $SiO_2$ (silicon oxide) or SiN (silicon nitride) interposed therebetween. The capacitor electrode may be formed using the same material in the same layer as the signal line Y. Further, a common electrode or a pixel electrode layer, which is usually formed on the array substrate, may be used as the capacitance electrode.

In the case that the edge sides W1, W2 of the projections WA, WB are formed so as to be obliquely crossing the first scanning lines XAW, XBW as illustrated in FIG. 1, the length of the first scanning line changes gradually even in the projections WA, WB. The scanning line XAW1 having a longer sum of a routing distance between the scanning line driving circuit 2A and the display region 101 and a distance in the display region 101 and the scanning line XAW2 having a shorter sum are illustrated among the first scanning lines.

In the case that the influence of the number of pixels in the display region 101 is larger than the influence of the wiring routing in the peripheral region 102, it can be said that the scanning line XAW1 having the larger number of pixels P to be driven in the display region 101 and the scanning line XAW2 having the smaller number of pixels P to be driven are illustrated among the first scanning lines. In any case, a value of capacitance C may be changed according to magnitude of the value. In the first scanning lines XAW, XBW, the capacitance may be decreased with increasing number of pixels P to be driven. In that case, the capacitance of C1 may be smaller than the capacitance of C2 in FIG. 1.

As described above, the capacitance value may be decreased with increasing lengths of the first scanning lines XAW1, XAW2. For example, an area of the pattern forming the capacitance may be reduced. Not only the unevenness generated in the vicinity of the projection but also the display quality in the right and left projections WA, WB can be improved by the combination of this mode.

In the first preferred embodiment, the first scanning lines XAW1, XAW2 in the projection WA have been described. However, the same holds true for the first scanning lines XBW1, XBW2 in the projection WB.

Second Preferred Embodiment

Figure 2:
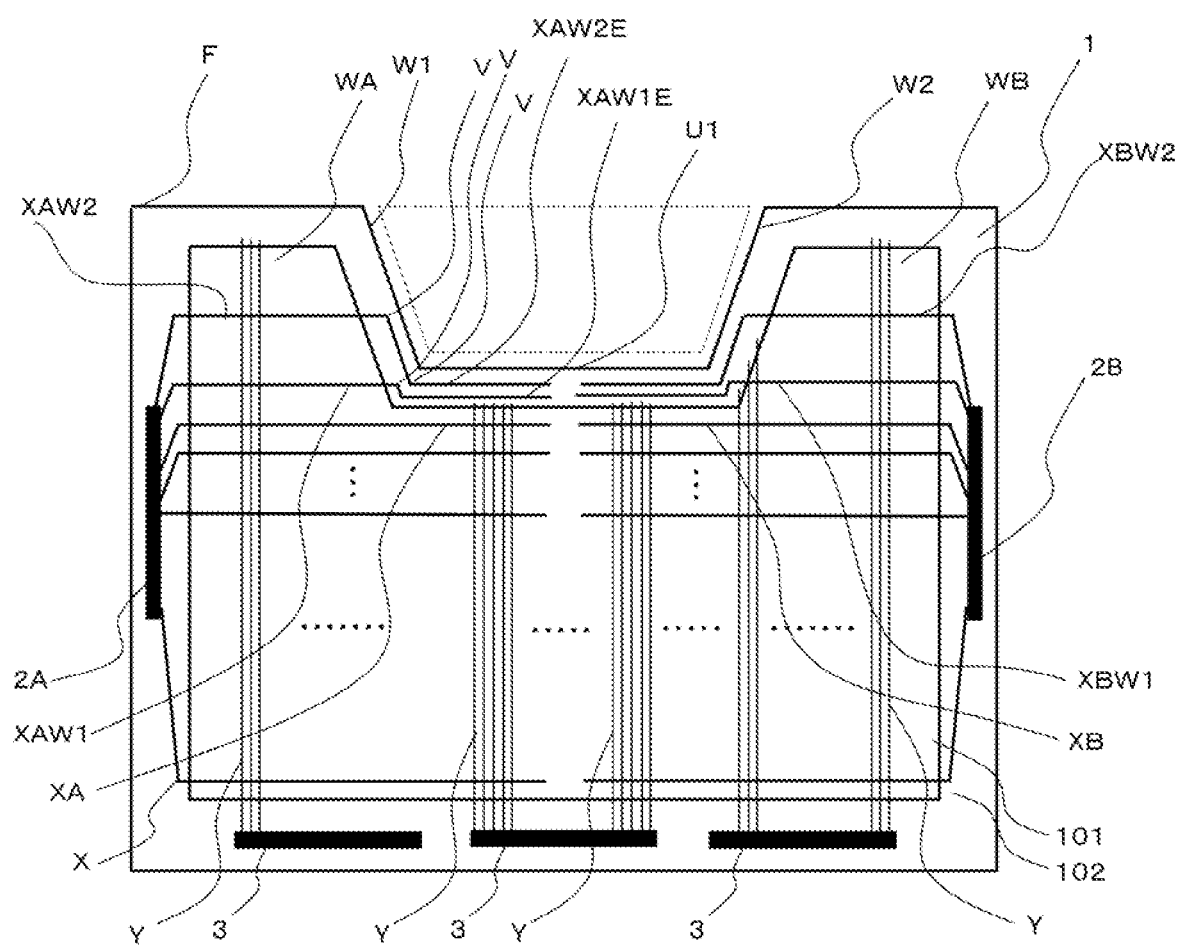
FIG. 2 illustrates a liquid crystal display device according to a second preferred embodiment.

In the description of the first preferred embodiment, the scanning lines XAW, XBW divided by the projections WA, WB are drawn to the outside of the display region 101 to connect the capacitors. The means for compensating for the influence of the wiring length between the first scanning lines XAW, XBW and the second scanning lines XA, XB is not limited to the first preferred embodiment. For example, the influence may be compensated by changing the length or width of the extended scanning line that is the scanning line extended to the outside of the display region 101. FIG. 2 illustrates a liquid crystal display device according to a second preferred embodiment.

Hereinafter, two scanning lines XAW1, XAW2 will be described as an example of the first scanning line, and the same holds true for a relationship between the scanning line XB and the first scanning line. In the second preferred embodiment, a bent portion V is formed on the first scanning line outside the display region 101, namely, the extended scanning line. On the other hand, the bent portion V is not provided in the second scanning line. With this configuration, the substantial length of the first scanning line is extended, so that the difference in length between the first scanning line XAW1, XAW2 and the second scanning line XA is compensated for. Consequently, the degradation of the display quality can be prevented similarly to the first preferred embodiment.

In FIG. 2, the scanning line XAW1 having the longer sum of the routing distance between the scanning line driving circuit 2A and the display region 101 and the distance in the display region 101 and the scanning line XAW2 having the shorter sum are illustrated among the first scanning lines XAW. The mode in which the length of the extended scanning line of the scanning line XAW1 is shorter than the length of the extended scanning line of the scanning line XAW2 may be combined in the second preferred embodiment. Not only the unevenness generated in the vicinity of the projection but also the display quality in the right and left projections WA, WB can be improved by the combination of this mode.

Although not illustrated, the width of the extended scanning line may be changed. In the second preferred embodiment, the compensation can be performed in a wider range by appropriately combining the method for substantially lengthening the wiring by providing the bent portion V in the extended scanning line and the method for changing the width of the extended scanning line.

Third Preferred Embodiment

Figure 3:
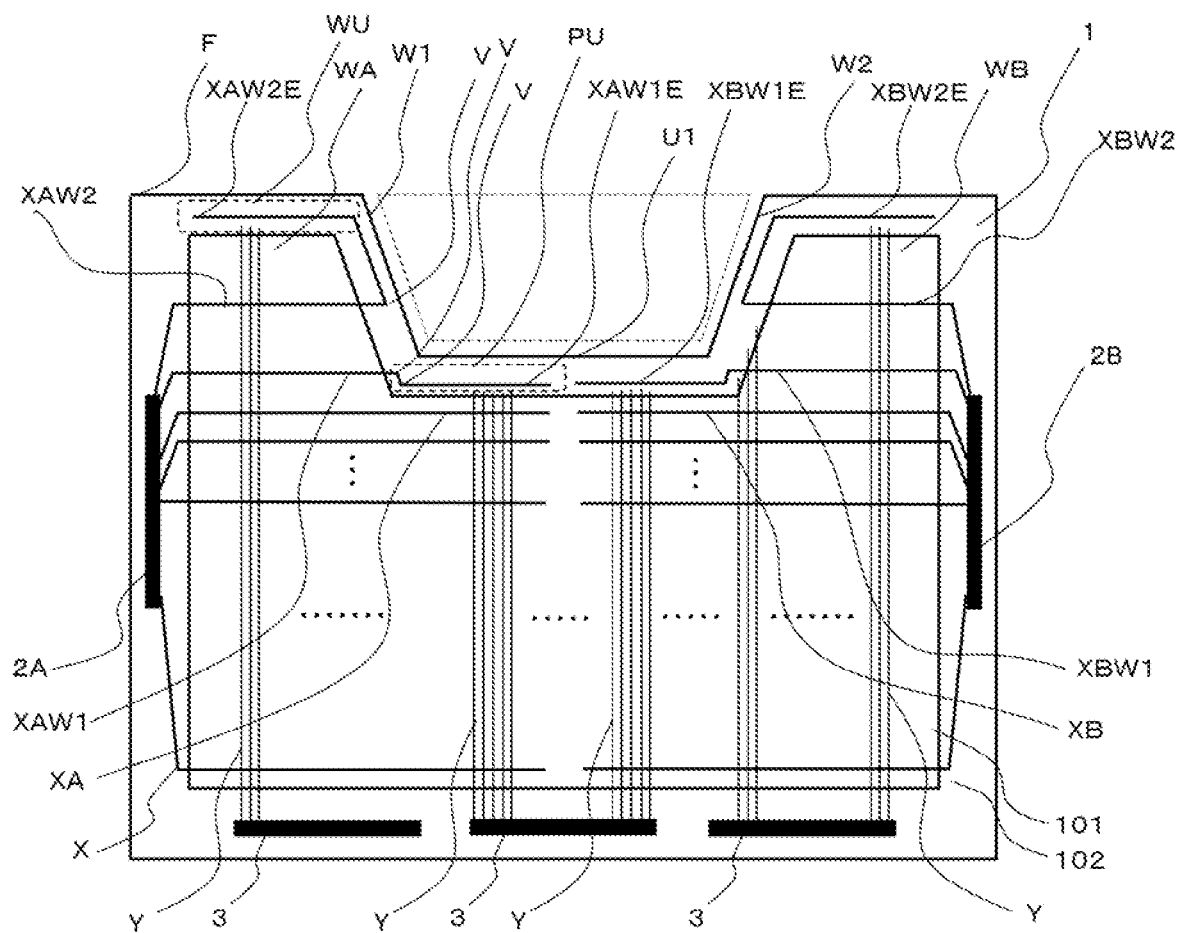
FIG. 3 illustrates a liquid crystal display device according to a third preferred embodiment.

The method for lengthening the extended scanning line has been described in the second preferred embodiment. However, merely lengthening the extended scanning line requires an extra space outside the display region 101, which increases the non-display portion of the liquid crystal display device. In the third preferred embodiment, as illustrated in FIG. 3, the extended scanning line is routed to the non-notched upper frame WU and the notch upper frame PU in order to solve this problem. At this point, the non-notched upper frame WU is a frame of the projection WA or the projection WB, and is also a frame on a side having the projection WA and the projection WB. The notch upper frame PU is the frame at the notch edge side U1.

In this way, it is not necessary to add the extra space by routing the extended scanning line in the region that is secured as the frame of the liquid crystal display device, which contributes to the narrow frame of the liquid crystal display device.

Fourth Preferred Embodiment

Figure 4A:
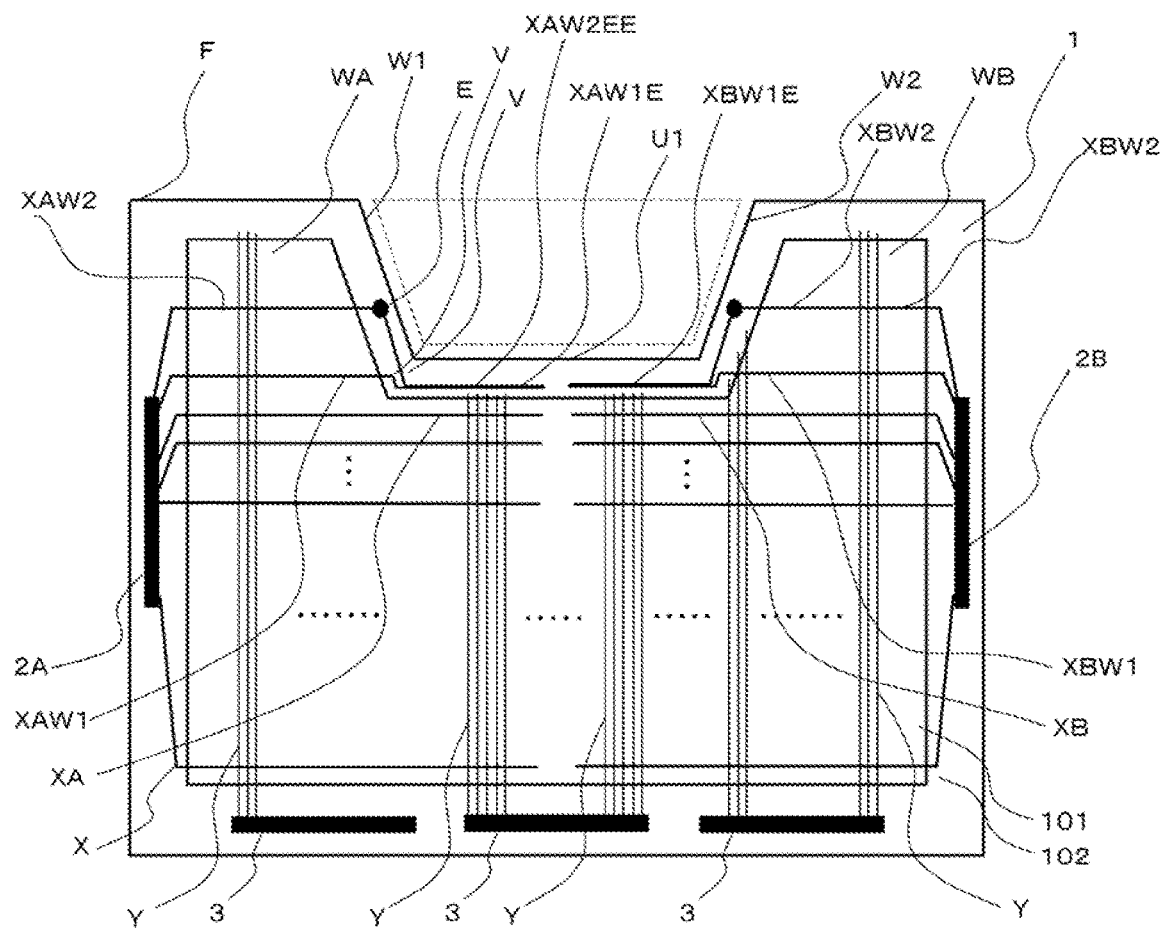
FIGS. 4A to 4C illustrate a liquid crystal display device according to a fourth preferred embodiment.

The mode contributing to the narrow frame of the liquid crystal display device has been described in the third preferred embodiment. In a fourth preferred embodiment, a different mode will be described with reference to FIGS. 4A to 4C. FIG. 4A illustrates a liquid crystal display device according to the fourth preferred embodiment, FIG. 4B is a sectional view of a conversion portion, and FIG. 4C illustrates an overlapping portion of the scanning lines XAW1, XAW2.

The scanning lines XAW1, XAW2 that are first scanning lines are illustrated in FIG. 4A. The scanning lines XAW1, XAW2 are formed in the same layer. A conversion portion E is formed on the scanning line XAW2 as one of the scanning lines.

Figure 4B:
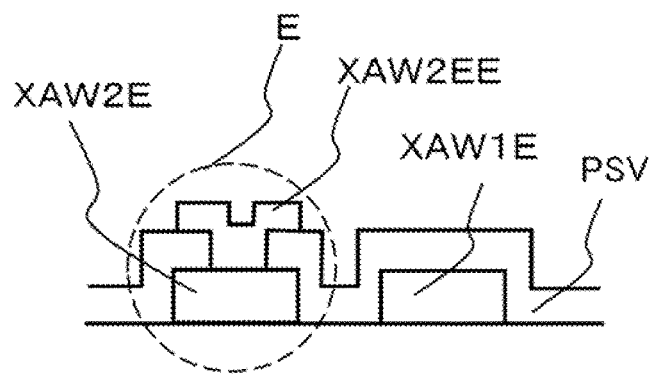
Figure 4C:
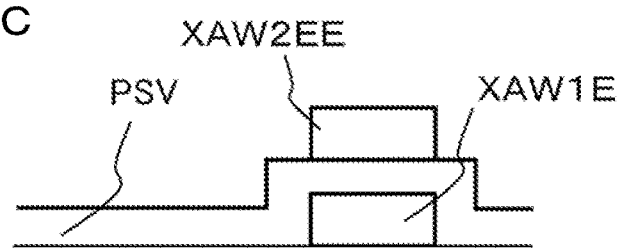

As illustrated in FIG. 4B, the conversion portion E is configured such that an extended scanning line XAW2E extending from the scanning line XAW2 and an extended scanning line XAW2EE converted through an insulating film PSV are connected through a contact hole. On the other hand, the conversion portion is not provided in the scanning line XAW1. The insulating film PSV may be an insulating film separating the scanning line and the signal line, or an insulating film other than the insulating film separating the scanning, line and the signal line.

In this configuration, the first scanning lines XAW1, XAW2 are located in the same layer, while the extended scanning line XAW1E of the first scanning line XAW1 and the extended scanning line XAW2EE of the first scanning line XAW2 are formed in different layers with the insulating film PSV interposed therebetween.

In the fourth preferred embodiment, as illustrated in FIG. 4C, the extended scanning line XAW1E of the first scanning line XAW1 and the extended scanning line XAW2EE of the first scanning line XAW2 overlap each other with the insulating film interposed therebetween. According to this configuration, the capacitance is added to each extended scanning line, and the same effect as the first preferred embodiment can be obtained. Additionally, in the fourth preferred embodiment, the contribution to the narrow frame of the liquid crystal display device can be made by overlapping the extended scanning lines with each other.

The display region includes the notch in the first to fourth preferred embodiments.

These may appropriately be combined. Although the effect is restricted as compared with the case including the notch, the preferred embodiment of the present invention can be applied even to the display region such as a triangle or a trapezoid, which does not include the notch.

In the preferred embodiments, the scanning line X is separated on the left and right by the projection. However, the present invention can also be applied to a configuration in which the scanning line X is not separated. However, in this case, an extent of compensation becomes larger, so that the range of the compensation and an occupied area of the capacitance or the extended scanning line can be narrowed in the mode in which the scanning line is divided on the left and right as described in the preferred embodiments.

Further, the present invention cart be applied to not only the liquid crystal display device but also a display device in which unevenness of electric resistance of the wiring and capacitance becomes problematic, for example, an organic EL display device or a display device in which an electrophoretic principle is used.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
an array substrate; and
a counter substrate opposed to the array substrate, the array substrate and the counter substrate being bonded to each other so as to enclose liquid crystal,
wherein
the array substrate includes a display region and a peripheral region,
a plurality of scanning lines and a plurality of signal lines that cross the scanning lines with an insulating film interposed therebetween extend from the display region to the peripheral region,
the scanning lines and the signal lines cross each other in the display region to define respective pixels,
the scanning lines include a plurality of first scanning lines and a plurality of second scanning lines,
each of the first scanning lines drives a smaller number of the pixels than a number of the pixels driven by any of the second scanning lines,
a first capacitance is added to a first one of the first scanning lines in the peripheral region, and a second capacitance is added to a second one of the first scanning lines in the peripheral region, and
the array substrate includes two opposing edge sides, each extending obliquely with respect to an extending direction of the first scanning lines to form a recessed region that increases in width in a direction away from the second scanning lines toward an outer edge of the array substrate, such that the first one of the first scanning lines closest to the second scanning lines is longer than the second one of the first scanning lines further away from the second scanning lines, and a value of the first capacitance is smaller than a value of the second capacitance.

2. The liquid crystal display device according to claim 1, wherein
the display region includes the recessed region and a projection on a side identical to the recessed region,
the first scanning lines are disposed in the display region of the projection, and
the second scanning lines are disposed in the display region other than the projection.

3. The liquid crystal display device according to claim 2, wherein the value of the first capacitance increases with decreasing number of the pixels to be driven in the first one of the first scanning lines, and the value of the second capacitance increases with decreasing number of the pixels to be driven in the second one of the first scanning lines.

4. The display device according to claim 2, wherein
one of the first scanning lines further includes an extended scanning line that is extended to an outside the display region, and
the extended scanning line is lengthened with decreasing number of the pixels to be driven in the one of the first scanning lines.

5. The liquid crystal display device according to claim 2, wherein
one of the first scanning lines further includes an extended scanning line that is extended to an outside the display region, and
the extended scanning line is extended to at least one of a notch upper frame that is a vicinity of an edge side of the recessed region and a non-notched upper frame that is a vicinity of an edge side of the projection.

6. The liquid crystal display device according to claim 2, wherein
one of the first scanning lines includes:
an extended scanning line that is extended to an outside the display region; and
a conversion portion in which at least one of the extended scanning lines is converted into a different layer with an insulating film interposed therebetween,
the extended scanning line converted into the different layer includes a region overlapping another extended scanning line, which is not converted, with the insulating film interposed therebetween.

7. The liquid crystal display device according to claim 1, wherein
the second scanning lines are not directly connected to the first scanning lines.

8. The liquid crystal display device according to claim 1, wherein
the second scanning lines extend further into the display region than all of the first scanning lines in plan view.

* * * * *